(12) United States Patent
Silva

(10) Patent No.: US 9,805,401 B2
(45) Date of Patent: Oct. 31, 2017

(54) SKU TRANSLATION BETWEEN POINT OF SALE SYSTEMS IN KIOSK-BASED QUICK SERVICE RESTAURANT ENVIRONMENTS

(75) Inventor: John Silva, San Diego, CA (US)

(73) Assignee: Tillster, Inc., San Diego, CA (US)

( * ) Notice: Subject to any disclaimer, the term of this patent is extended or adjusted under 35 U.S.C. 154(b) by 2700 days.

(21) Appl. No.: 12/167,047

(22) Filed: Jul. 2, 2008

(65) Prior Publication Data

US 2009/0228836 A1    Sep. 10, 2009

Related U.S. Application Data

(60) Provisional application No. 61/033,681, filed on Mar. 4, 2008, provisional application No. 61/052,564, filed on May 12, 2008.

(51) Int. Cl.
*G06Q 40/00* (2012.01)
*G06Q 30/06* (2012.01)
*G07G 1/00* (2006.01)
*G07G 1/14* (2006.01)

(52) U.S. Cl.
CPC ....... *G06Q 30/0603* (2013.01); *G07G 1/0045* (2013.01); *G07G 1/145* (2013.01)

(58) Field of Classification Search
USPC .......................................................... 705/10
See application file for complete search history.

(56) References Cited

U.S. PATENT DOCUMENTS

| | | | |
|---|---|---|---|
| 2007/0226056 A1* | 9/2007 | Belanger et al. | 705/14 |
| 2009/0292591 A1* | 11/2009 | Schultz et al. | 705/10 |
| 2010/0280918 A1* | 11/2010 | Balent | 705/26 |

* cited by examiner

*Primary Examiner* — Shay S Glass
(74) *Attorney, Agent, or Firm* — Knobbe, Martens, Olson & Bear, LLP

(57) ABSTRACT

Disclosed embodiments provide the ability to create a single customer-operated kiosk quick service restaurant ordering system menu application which may be easily integrated with any number of different back office point of sale system implementations without compromising menu design and the customer user interface experience.

32 Claims, 14 Drawing Sheets

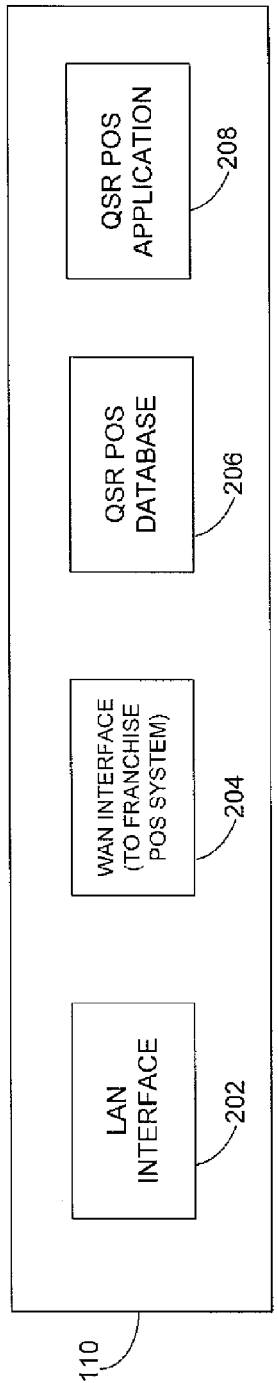

FIG. 2A

| SKU | ITEM | PRICE |
|---|---|---|
| 001 | CHICK_SAND | $5.99 |
| 002 | CHICK_SAND_ADD_SWISS | $5.99 |
| 003 | CHICK_SAND_ADD_BACON | $6.49 |
| 004 | CHICK_SAND_ADD_ADD_MEAT | $7.99 |
| 005 | CHICK_SAND_ADD_SWISS_ADD_MEAT | $7.99 |
| 006 | CHICK_SAND_ADD_AMERICAN_ADD_MEAT | $7.99 |
| 007 | CHICK_SAND_ADD_SWISS_ADD_BACON | $6.49 |
| 008 | CHICK_SAND_ADD_MEAT_ADD_BACON | $8.49 |
| 009 | CHICK_SAND_ADD_SWISS_ADD_MEAT_ADD_BACON | $8.49 |
| 010 | CHICK_SAND_ADD_SWISS_ADD_MEAT_ADD_BACON_ADD_AVOCADO | $9.49 |
| 011 | CHICK_SAND_ADD_SWISS_ADD_MEAT_ADD_BACON_ADD_CHEESE | $8.99 |
| 012 | CHICK_SAND_ADD_AMERICAN_ADD_MEAT_ADD_AVOCADO | $8.99 |
| 013 | CHICK_SAND_ADD_AMERICAN_ADD_MEAT_ADD_BACON | $8.49 |
| 014 | CHICK_SAND_ADD_JACK_ADD_MEAT_ADD_BACON_ADD_AVOCADO | $9.49 |

FIG. 2B

| ENTITY_ID | SKU | SKU_OWNER | SKU_DESC |
|---|---|---|---|
| 0001 | SAND | KIOSK | SANDWICH |
| 0002 | CHICKEN | KIOSK | CHICKEN MODIFIER |
| 0003 | TURKEY | KIOSK | TURKEY MODIFIER |
| 0004 | HAM | KIOSK | HAM MODIFIER |
| 0005 | RBEEF | KIOSK | ROAST BEEF MODIFIER |
| 0006 | VEG | KIOSK | VEGATABLE MODIFIER |
| 0007 | ITALBRD | KIOSK | ITALIAN BREAD |
| 0008 | WHITEBRD | KIOSK | WHITE BREAD |
| 0009 | IHCBRD | KIOSK | ITALIAN HERB AND CHEESE BREAD |
| 0010 | AMCHSE | KIOSK | AMERICAN CHEESE |
| 0011 | SWSCHSE | KIOSK | SWISS CHEESE |
| 0012 | JCKCHS | KIOSK | JACK CHEESE |
| 0013 | DBLMEAT | KIOSK | DOUBLE MEAT MODIFIER |
| 0014 | BACON | KIOSK | BACON MODIFIER |
| 0015 | XCHS | KIOSK | EXTRA CHEESE |
| 0016 | 001 | POS | CHICK_SAND |
| 0017 | 002 | POS | CHICK_SAND_ADD_SWISS |
| 0018 | 003 | POS | CHICK_SAND_ADD_BACON |
| ... | | | |

*FIG. 6A*

| SKU_GROUP_ENTITY_ID | PRICE | SKU_GROUP_ENTITY_DESC | STATUS |
|---|---|---|---|
| 0001 | 5.99 | CHICKEN SANDWICH ON WHITE BREAD | AVAILABLE |
| 0002 | 5.99 | CHICKEN SANDWICH ON WHITE BREAD W/ SWISS CHEESE | AVAILABLE |
| 0003 | 6.49 | CHICKEN SANDWICH ON WHITE BREAD W/ BACON | AVAILABLE |
| ... | | | ... |

*FIG. 6B*

| SKU_GROUP_ENTITY_ID | ENTITY_ID | SORT_ORDER |
|---|---|---|
| 0001 | 0016 | 1 |
| 0002 | 0017 | 1 |
| 0003 | 0018 | 1 |

*FIG. 6C*

```
<template-application name="sandwiches with meat choice">
<!-- sandwich products -->
<apply-template baseProduct="SAND" meatType="CHICKEN" mod1="SWSCHSE" posSKU="CHICK_SAND_ADD_SWISS"/>
<apply-template baseProduct="SAND" meatType="CHICKEN" mod1="BACON" posSKU="CHICK_SAND_ADD_BACON"/>

<template>
<param name="baseProduct"/>
<param name="productType"/>
<param name="mod1"/>
<param name="posSKU"/>

<output-mapping>

<fromSKUs>
  <sku name="${baseProduct}">
    <sku name="${meatType}"/>
    <sku name="${mod1}"/>
  </sku>
</fromSKUs>
<output type="PRICING POS"
  <sku name="${posSKU}"/>
</output>
</output-mapping>
</template>
</template-application>
```

*FIG. 7*

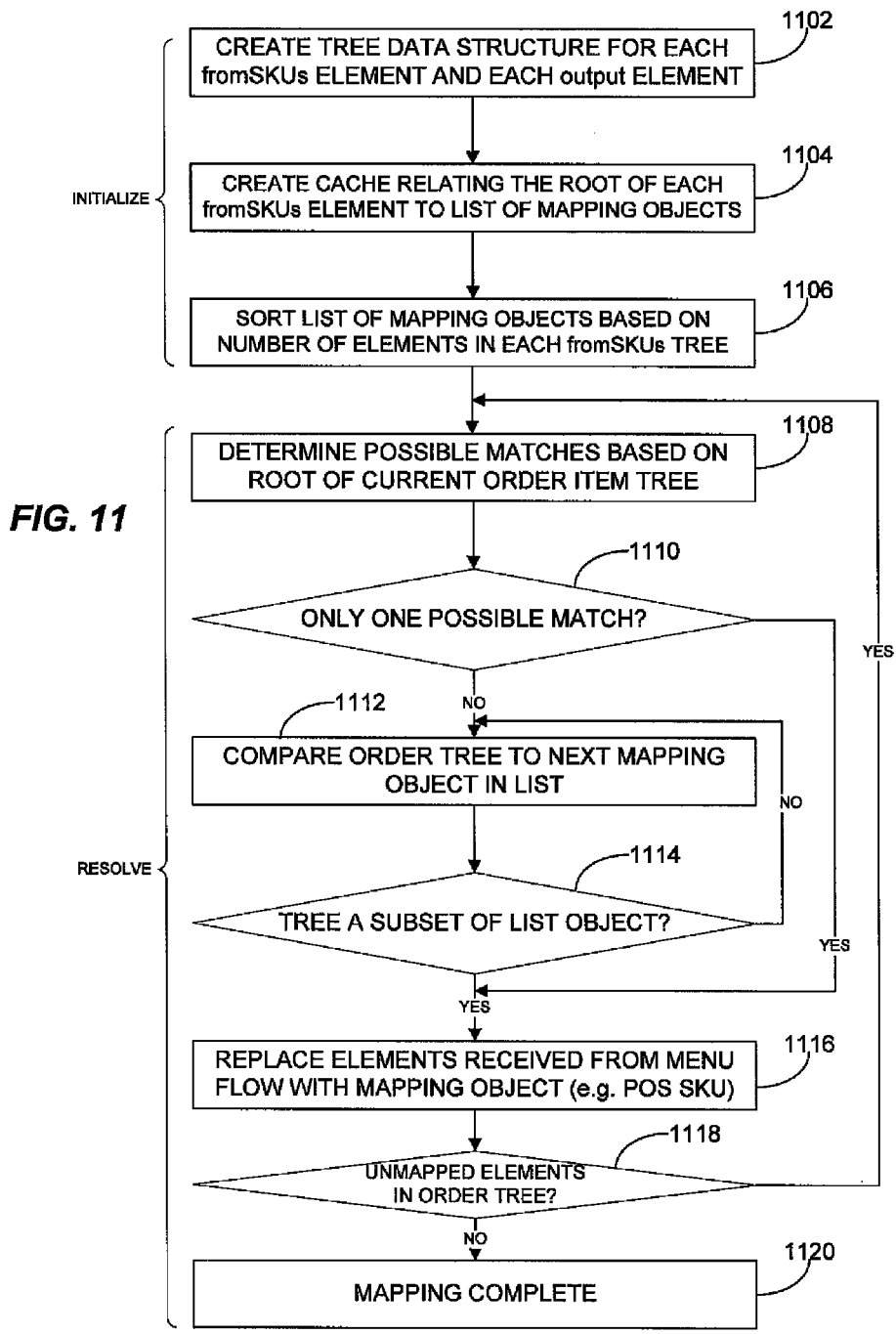

SKU TRANSLATION BETWEEN POINT OF SALE SYSTEMS IN KIOSK-BASED QUICK SERVICE RESTAURANT ENVIRONMENTS

CROSS-REFERENCE TO RELATED APPLICATIONS

This application claims the benefit of U.S. Provisional Patent Application Nos. 61/033,681 and 61/052,564, filed on Mar. 4, 2008 and May 12, 2008, respectively, the entire contents of which are incorporated by reference herein in their entirety.

BACKGROUND OF THE INVENTION

Field of the Invention

This application relates to point of sale (POS) systems integration and information translation in kiosk-based quick service restaurant ordering systems. In particular, this application relates to systems and methods which allow kiosk-based ordering environment to easily maintain price and menu synchronization with multiple POS systems.

Description of the Related Technology

In a quick service restaurant (QSR) environment, customer-operated ordering kiosks may be utilized to allow customers to place their food orders. These customer-operated ordering kiosks (also referred to herein as "self-service kiosks") typically display menus or items available for purchase. In some instances, the kiosk ordering systems may be tied into a point of sale (POS) system which is used to manage sales, inventory, and other aspects of the broader QSR operation. Existing restaurant POS systems do not integrate effectively with self-service kiosks across a chain or brand of retail environments in which product items (and their underlying data) are represented in different ways among different stores, locations, regions, and the like.

SUMMARY OF CERTAIN INVENTIVE ASPECTS

The system, method, and devices of the present invention each have several aspects, no single one of which is solely responsible for its desirable attributes. Without limiting the scope of this invention, several of its features will now be discussed briefly.

A computer-implemented method of integrating a customer-operated ordering kiosk system with a point of sale (POS) system, the method comprising receiving a customer inputted selection of a product to order at the kiosk system; determining a kiosk SKU value based on the customer inputted selection; accessing SKU mapping data to determine one or more POS SKU values indicative of the customer inputted selection; and transmitting the determined one or more POS SKU values to the POS system.

A customer-operated kiosk ordering system for use in a quick service restaurant environment, comprising an ordering application configured to provide a customer-operated ordering input interface; a kiosk database configured to store data indicative of items available for ordering by customers utilizing the ordering application; a translation module configured to receive kiosk SKU data from the ordering application based on an item ordered in the ordering application, and to translate the kiosk SKU data into corresponding point of sale system (POS) SKU indicative of the item ordered; and a network interface configured to transmit the POS SKU indicative of the item ordered to the point of sale (POS) system.

BRIEF DESCRIPTION OF THE DRAWINGS

FIG. 2A is a more detailed view of a restaurant POS system from FIG. 1.

FIG. 2B is one example of a restaurant POS database schema.

FIGS. 6A-6C are example of tables from FIG. 5 populated with SKU-related data.

FIG. 7 is an example of an SKU mapping document.

FIG. 11 is another example of a SKU translation process.

In this description, reference is made to the drawings wherein like parts are designated with like numerals throughout.

DETAILED DESCRIPTION OF CERTAIN INVENTIVE EMBODIMENTS

Figure 1:
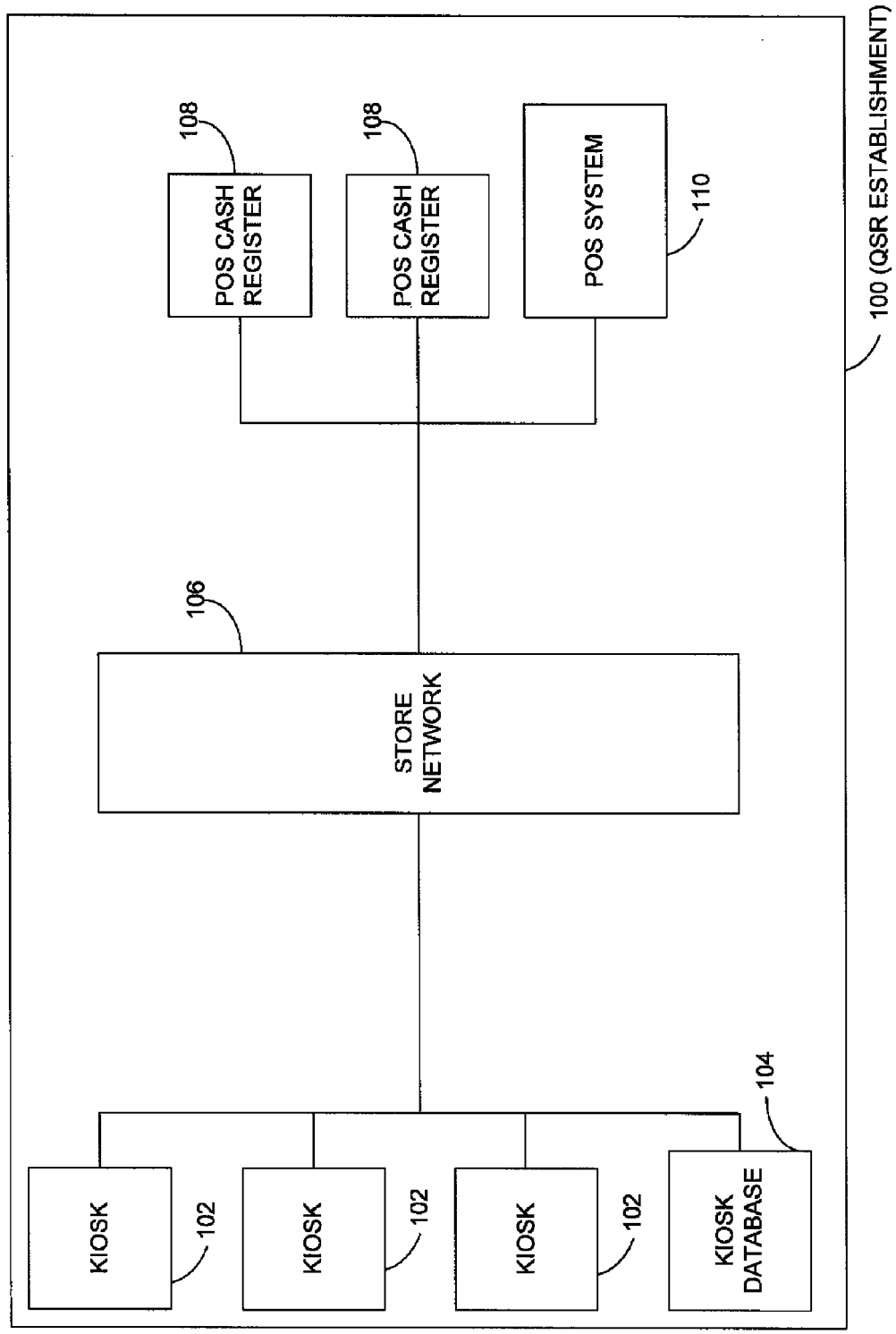
FIG. 1 is an example of a kiosk-based ordering environment suitable for implementation of one or more embodiments.

Embodiments disclosed herein are directed to systems and methods which allow a customer-based quick service restaurant ordering kiosk system to interface with any type of POS back office system without requiring changes in the code, menu, or menu layout provided in the kiosk environment. The process of implementing a customer-based kiosk ordering system within a QSR environment is typically complicated by a number of factors. QSR operators often require that an installed kiosk system be able to integrate in various ways with an existing POS system. The existing POS system may include a "back office" computer components that is used to manage the POS operations of the QSR, as well as cash registers (also known as POS terminals) which are used by QSR employees to input customer orders and handle customer transactions. For example, a kiosk system may be required to share customer order data with the POS system in real time so that input are orders can be immediately processed by the POS system. The kiosk system may also be required to be integrated with the POS system so as to retrieve pricing data and menu data in real time so that the menu is up to date and accurate.

A customer-operated kiosk ordering system is most effective when the menu layout is provided in a manner that is both functionally and aesthetically pleasing to the customer using the kiosk. Accordingly, the menu flow and design of the kiosk is a contributing factor to the success of the kiosk system within any QSR environment. Many times, the POS database structure does not lend itself to a type of menu flow which is effective in a customer ordering environment. This comes as no surprise given that the POS systems are typically designed to have orders input at cash registers by trained QSR employees. A developer tasked with creating a kiosk menu flow that integrates with a store POS system is often faced with a difficult choice: the developer may create a menu flow that emphasizes user experience, but to do so requires extensive customization of the menu programming to tie it into the POS backend. Alternatively, the menu flow may be designed to be easily integrated with the POS, but doing so limits how the menu flow may be designed and presented to customers within the QSR environment.

Another problem typically encountered in the kiosk/POS integration process stems from a lack of uniformity of POS implementations within a single franchise or organizations. A kiosk provider may be asked to develop a kiosk menu flow for many stores in a franchise. However, franchisers may allow their franchisees to choose among several different POS systems to use in operating their particular locations. Thus, while the menu and act should look the same across the franchise, the back end systems that the menu designer must work with may be quite different in structure and operation. As a result, for each different POS system the menu flow may need to be substantially rewritten in order to properly integrate with the POS system.

In order to overcome these limitations, the inventor has devised a system and method which adds a translation layer between the kiosk system and the POS system or framework which converts kiosk SKU values into corresponding POS SKU's in real time. The translation layer allows the menu flow to be completely decoupled from the POS structure, alleviating the need to consider the POS structure when designing menu flow. This decoupling ensures that the menu design is not compromised by an inflexible POS backend, but it also allows a single menu and code base to be implemented with several POS systems without needing to restructure or rewrite the code or restructure menu flow.

FIG. 1 is an example of a QSR restaurant environment 100 in which various embodiments may be practiced. The QSR restaurant environment is typically a "fast food" restaurant which offers "counter service" food to customers. The customers may place orders with customer service representatives employed by the QSR which are entered into cash registers 108. The cash registers 108 are connected to the POS back office system 110 of the QSR establishment, and the sales data generated at the cash registers 108 is typically transferred over a store network 106 within the QSR establishment into the POS system 110. The store network 106 is typically a local area network (LAN) as is known in the art. The LAN may be a wired network or a wireless network, or some combination of the two. The store network connect various systems on the network using one or more network protocols such as TCP/IP, for example. The cash registers 108 may form a part of the POS system itself, or alternatively, the cash registers 108 may be provided by a separate vendor and be integrated into the POS system 110 when installed at the QSR establishment 100.

Also attached to the store network 106 may be one or more customer-based ordering kiosks 102. The kiosks 102 are typically made available to guests in the QSR establishment to allow them to place their orders by inputting their desired food and drink items via a touch screen user interface on the kiosk 102. The structure and operation of the kiosk 102 is discussed in further detail below with reference to FIG. 3. The kiosks 102 may be in communication with one or more kiosk databases 104. The kiosk database 104 is a database which stores data related to the use of the kiosk. The kiosk database 104 may store menu data which is used by the kiosk 102 to generate a menu on the touch screen interface of the kiosk device. The kiosk database 104 may be a relational database that is stored in a shared computing device accessible by each of the kiosks 102. Alternatively, the kiosk database 104 may be located in one of the kiosk systems 102. In still other implementations, a copy of the kiosk database 104 may be maintained in each of the kiosk systems independently.

FIG. 2A is a more detailed block diagram providing one example of the POS system 110 shown in FIG. 1. As shown, the POS system 110 includes a local area network interface (LAN) 202. The LAN network interface 202 may take the form of a network interface card that is installed on the computer hosting the POS system 110. The LAN interface 202 allows the POS system 110 to connect to the store network 106 and send and receive data over the network. The POS system 110 may also include a wide area network (WAN) interface 204. The WAN interface 204 may also take the form of a standard network interface card. The WAN interface 204 generally allows the POS system 110 to communicate with other computers outside of the store via a wide area network (not shown). In some embodiments, the WAN interface 204 allows the POS system 110 to send and receive data from a franchise POS system (also not shown) which may be used to collect POS data from some or all of the store locations associated with a franchise. The POS system 110 also may include a POS database 206. The POS database 206 may be a relational database that is used to store POS-related data in one or more related data tables. Alternatively, the POS database 206 may be a flat file type of database which stores data in a single table. Although the types of data stored in a particular location's POS database 206 may vary, the POS database 206 typically stores sales and inventory data, as well as menu data. Food products offered by the QSR to its customers may be identified by SKUs, which are unique identifiers of products. The POS system 110 also typically includes a POS application 210. The POS application 210 is the application software that is used to maintain the POS database 208 and interact with the cash registers 108 and other external devices via the network 106.

FIG. 2B provides one example of how the POS database 206 may store product menu data in a table which uniquely identifies products using SKUs. The table of data shown in FIG. 2B illustrates a "flat" menu data structure in which each item (and each modification of that item) has a separate SKU associated with it in the POS database 206. For example, a plain chicken sandwich is associated with a specific SKU— as shown in the first row which includes a record with an SKU of 001. A chicken sandwich can be modified in various ways when offered to the consumer. Each possible modification to the basic/plain chicken sandwich may be captured by the POS system 110 in various ways. In the example provided, each modification is stored as a separate SKU in the database table. Thus, a chicken sandwich with provolone cheese is stored as SKU 002, while a chicken sandwich with swiss cheese is stored as SKU 003. A chicken sandwich with extra meat is stored as SKU 004, etc. Each of the SKU's shown in the database table has an associated price.

Figure 3:
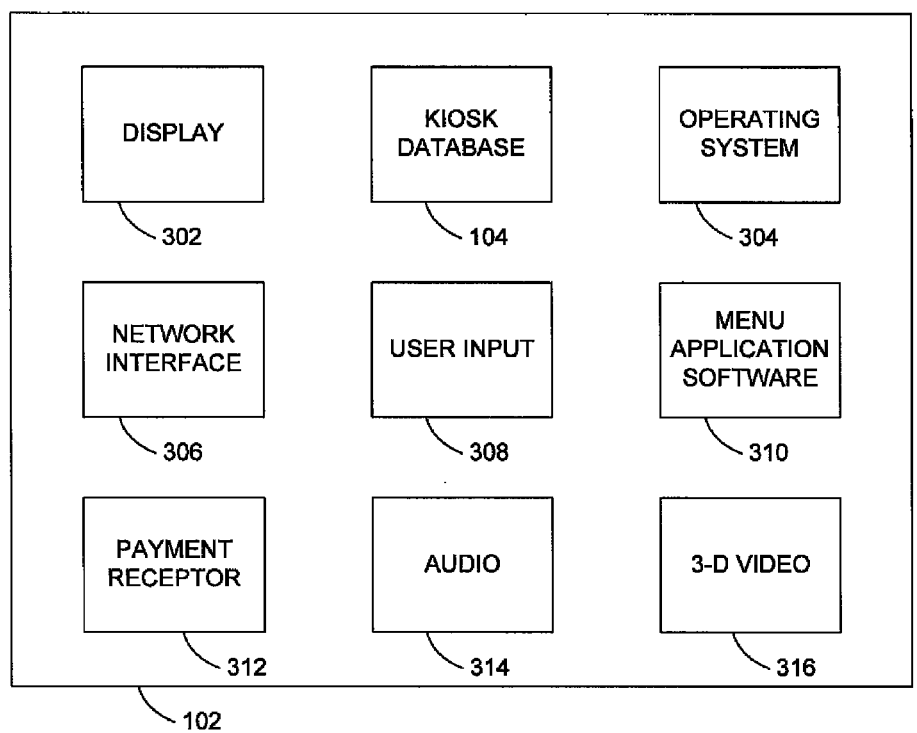
FIG. 3 is a more detailed view of a kiosk system from FIG. 1.

Turning now to FIG. 3, an example of a more detailed view of various hardware and software modules that may be included in a kiosk system 102 are provided. Although specific hardware and software modules are described in FIG. 3, it is to be appreciated that not all modules and/or hardware shown, and that the kiosk system 102 may include other modules not shown or described in this figure. Additionally, each of the modules described is not necessarily included in a kiosk system used to implement embodiments described herein.

As shown, the kiosk system 102 may include a display 102. The display 102 may be a touch screen display which is configured to allow users to input information into the kiosk system 102 by touching specific locations on the touch screen to indicate selections made by the user. As noted above, the kiosk system 102 may also include a kiosk database 104 which stores data related to the operation of the kiosk, such as, for example, menu data. In some embodiments, the kiosk system 102 may include an internal computer having an operating system 304. The operating system 304 may be a conventional off-the-shelf operating system such as Windows or Linux, or it may be a custom operating system written specifically to operate the kiosk software environment. In order to communicate with the store network 106, the kiosk system 102 may also include a network interface 306. The network interface 306 may be a standard network interface card which is controlled by the operating system 304 via a network interface driver. The kiosk system 102 may also include a user input device 308. As noted above, the touch screen display 302 may be configured to receive user input. In addition, other user input devices may be provided. These user input devices may include a keyboard, a touch pad, a mouse, or some other input device.

The user input devices 308 may be user to access ordering application software 310. The ordering application software 310 presents the QSR's menu on the touch screen so that restaurant guests may input their food orders on the using the kiosk device. The ordering application software 310 may include a real-time rendering engine that presents products, prices, and options to the customer. The ordering application software 310 may also include a transaction state management process which handles menu flow (based on customer input), order input, and payment. An example of the operation of ordering application software 310 is provided in FIGS. 4A-4D below. The kiosk system 102 may also include a payment receptor 312. The payment receptor 312 may be a cash handling device that allows guests to pay for their order by inserting cash into the kiosk device 102. The payment receptor may also include a card reading device which allows the kiosk 102 to accept payment via credit card, smart card or other object which serves to link to financial information. Also included in the kiosk system 102 may be an audio output 314. The audio output 314 may be configured to operate in conjunction with the ordering application software 310 to provide the restaurant guest with verbal instructions on operating the kiosk device 102. Finally, the kiosk system 102 may include a translation layer 316. The translation layer 316 is generally used to covert kiosk-based SKU data into SKU data that is understood by the POS system 110. The translation layer is described in additional detail with reference to FIGS. 7 and 8 below.

Figure 4A:
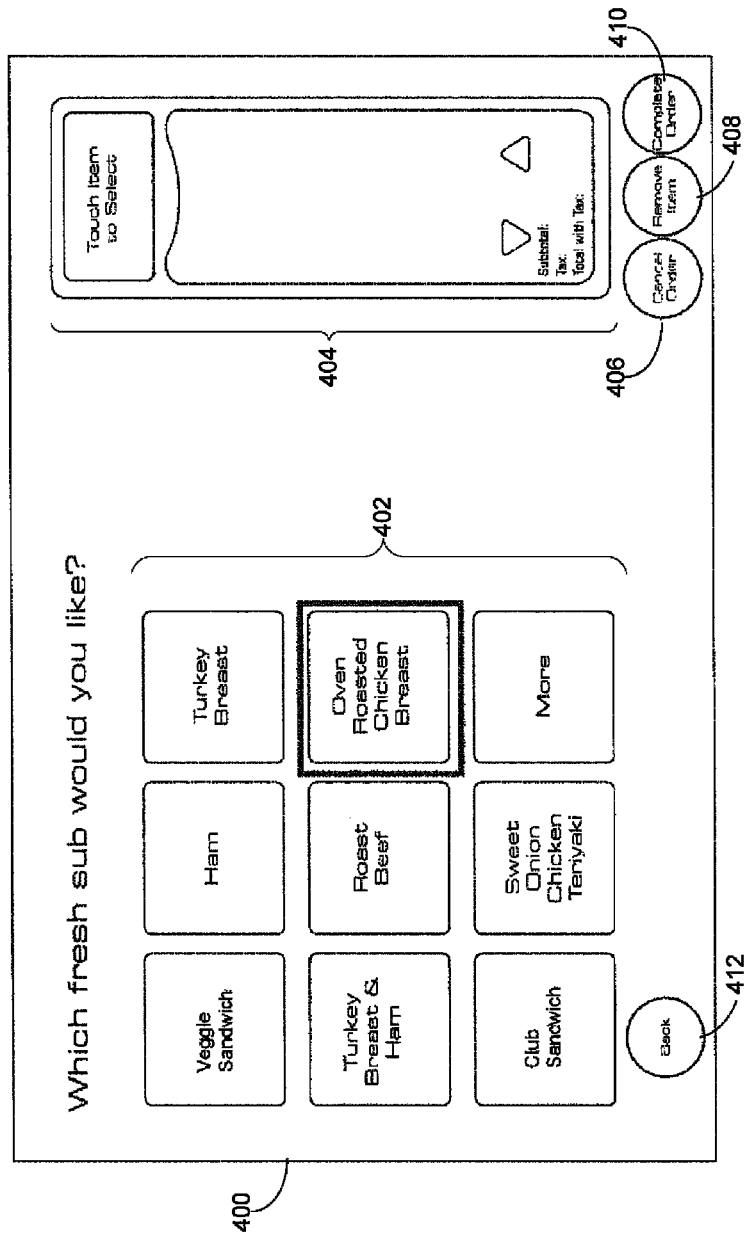
FIGS. 4A-4D are examples of a menu flow for the kiosk system from FIG. 3.

FIGS. 4A-4D provide an example of a menu flow 400 that may be generated by the ordering application software 310 on a touch screen display 302 of the kiosk system 102. In this particular example, the items shown in the figure reflect the data stored in the POS database 206 shown in FIG. 2B above. As shown, the menu flow 400 is presented to the user so that they may first select an item category, and then "drill down" to customize their selection by selecting modifiers for their category selection. This process may be managed by a transaction statement management service module in the application software 310. Referring specifically to FIG. 4A, the menu flow 400 is in a sandwich selection state that allows the customer to specify which type of sandwich they would like to order. The available sandwich selections are presented to the customer as button graphics 402, any of which may be touched by the user to make a selection. On the right side of the menu 400 is a till 404. The till 404 is used to maintain a running inventory of the items that have been added to an order. Associated with the till 404 are order management buttons 406, 408, and 410. These buttons may include a "Cancel Order" button 406 which allows a customer to cancel an order and restart the ordering process, a remove item button 408 which allows the user to remove a selected item from the order shown in the till 404, and a complete order button 410, which allows a user to move to the payment process after they have completed adding items to their order. Because the menu flow is controlled by a transaction state manager, a back button 412 may also be provided to allow a user to move to a previous menu flow state. When a user selects one of the button graphics 402, the display may provide a visual indication of that selection. In the example provided in FIG. 4A, the "Oven Roasted Chicken Breast" button has been selected by the user, and the corresponding button 402 is highlighted to show its selection.

Figure 4B:
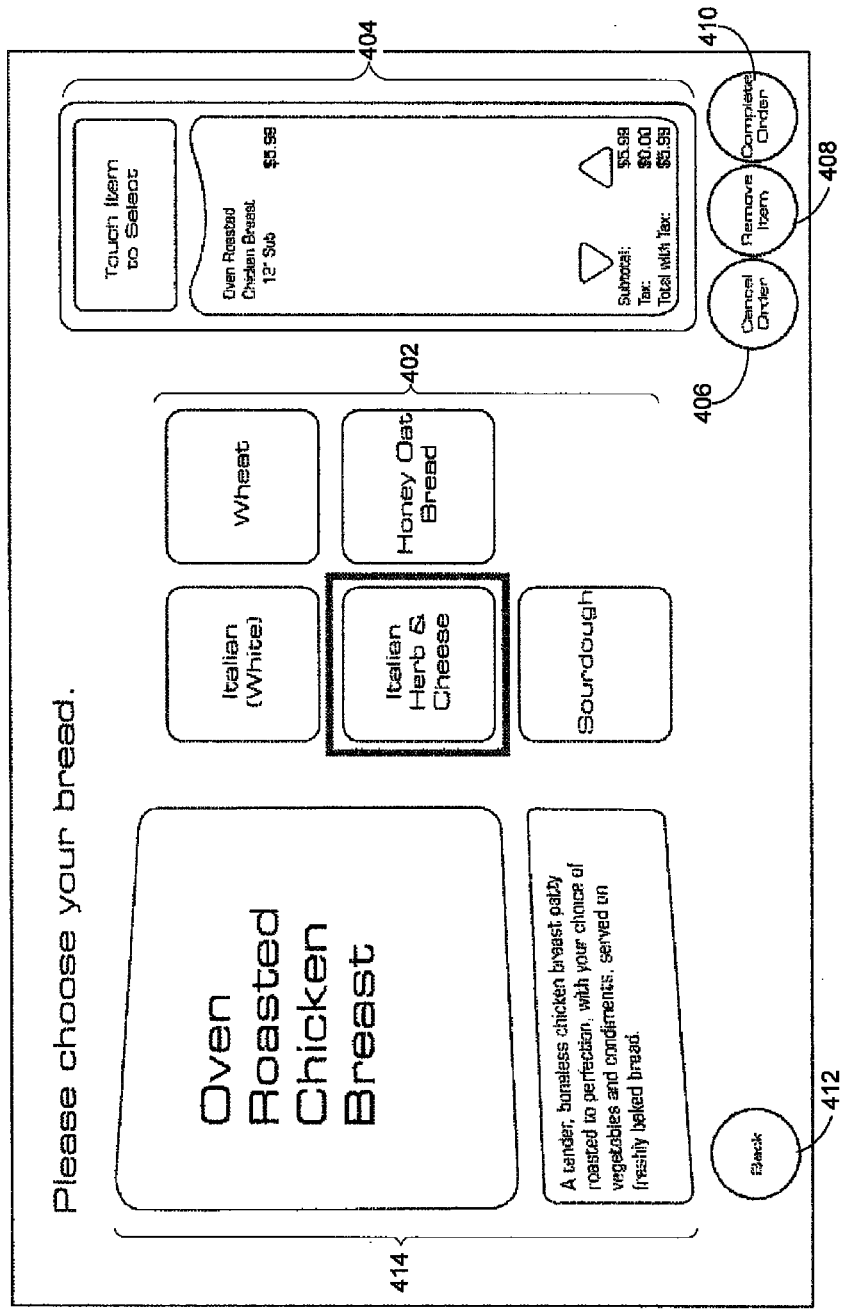

FIG. 4B shows the menu flow 400 after the selection of the "Oven Roasted Chicken Breast" button. Once the button has been selected, the menu application software 310 drills down to allow the user to further customize their sandwich order. The menu flow 400 has been modified to provide a selection indication element 414. The selection indication element 414 typically provides the user details on the type of item which they have already selected. Thus, in the example provided in FIG. 4B, the selection indication element 414 indicates that the Oven Roasted Chicken Breast sandwich has been selected, and the buttons 402 on the right side allow the user to customize that particular selection by selecting their desired bread for their sandwich. As noted previously, as selections are made, the till 404 may be updated to show the user the precise status of their order. In this particular instance, the till 404 has been updated to reflect the selection of the Over Roasted Chicken Breast item from the buttons 402 in FIG. 4A. The "Italian Herb & Cheese" button has been selected by the user, as indicated by its highlighted appearance.

Figure 4C:
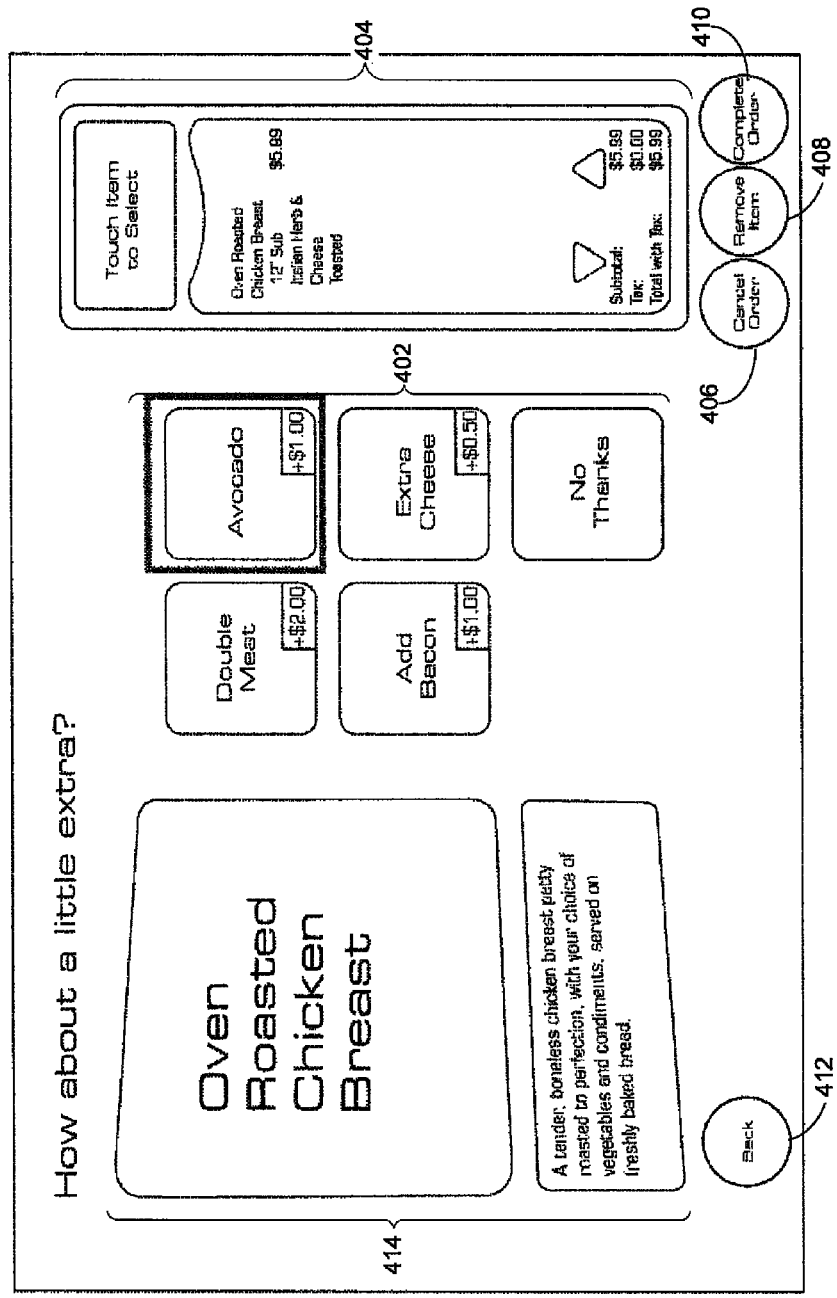
Figure 4D:
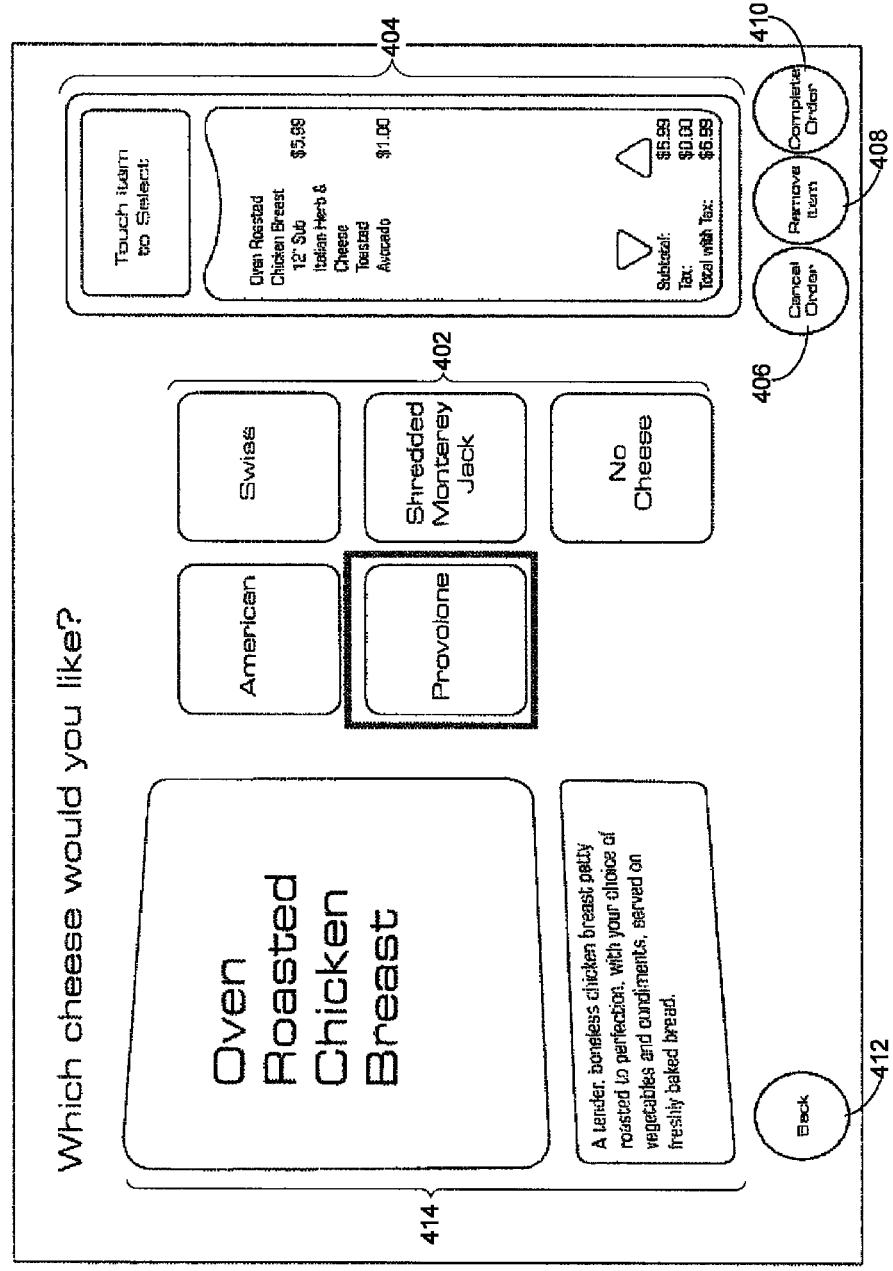

FIG. 4C shows the menu flow 400 after the selection of the bread choice from FIG. 4B. The till 404 indicates that a bread selection has been made. In addition, the customer is invited to add additional items to the sandwich order. The selection buttons 402 display various extras that may be included in the order, as well as the additional price associated with the extra item. In this example, the avocado button has been selected by the user. Referring now to FIG. 4D, the addition of the avocado to the sandwich is reflected in the till 404 (along with the associated price adjustment), and the user is invited to further customize their sandwich selection with a cheese selection. Accordingly, the selection buttons 402 display various cheese options available to the user.

Although the menu flow 400 described in FIGS. 4A-4D makes available the items from POS database 206 for purchase, it should be recognized that the interface provided to the user in such a way as to simplify the ordering process by allowing them to drill down through the data to make their selection. If the menu flow merely mimicked the structure of the data in POS database 206, the user would be faced with a single selection interface which merely included a button for each and every SKU made available in the system. Such an interface is not generally desirable because experience has shown that there is a potential for an "up selling" effect when the menu flow takes the user through all of the available modifications in a sequential and orderly manner. Accordingly, the data from the POS database 206 may be reorganized and restructured into a format that is more suitable for the menu flow 400 described in FIGS. 4A-4D. This restructured data may be provided in the kiosk database 104. Thus, the menu flow 400 provided by the application software 310 is generated based on data stored in the kiosk database 104.

Figure 5:
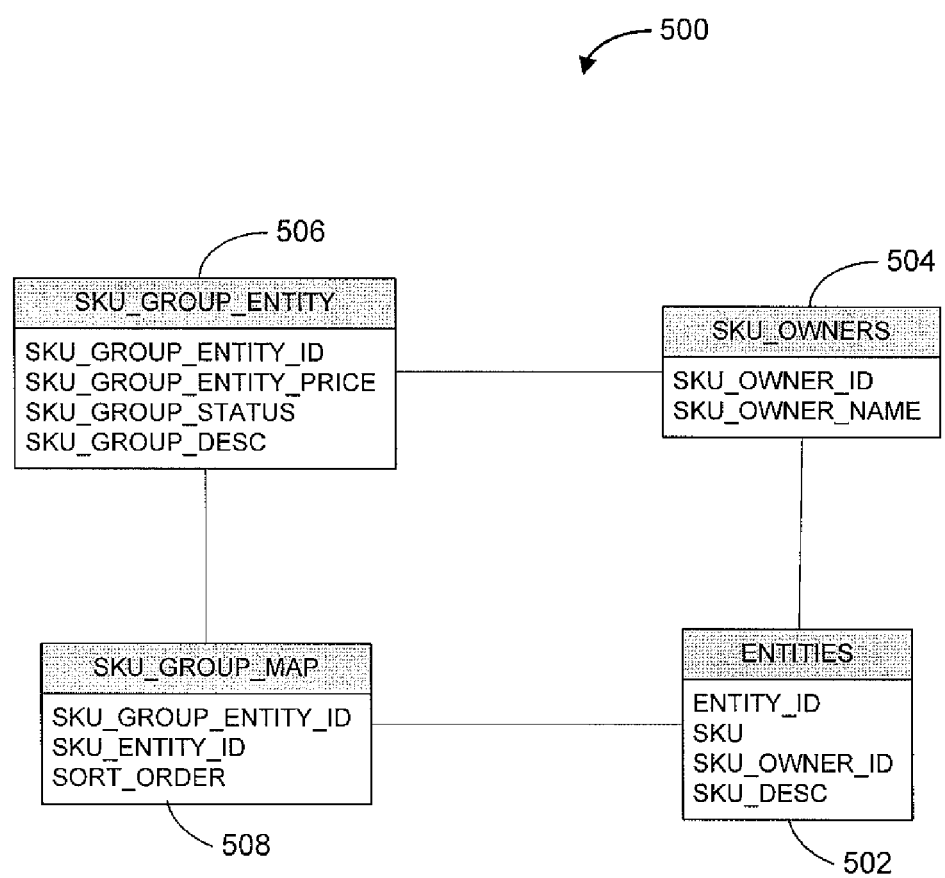
FIG. 5 is an example of a database schema suitable for use with the menu flow shown in FIGS. 4A-4D.

FIG. 5 provides an example of a database schema 500 that may be used to create kiosk database 104. The database schema 500 defines a generic database structure which may be used to describe the data stored in the POS database in such a way that it is amenable to creation of a hierarchical menu flow data structure that allows for product selection to precede the display of modifiers for the selected product (as shown in FIGS. 4A-4D). The database schema 500 includes four tables. The first table is an entity table 502. Each row in the entity table 502 defines an SKU which is used by the menu application 310 to display data within the menu flow 400 of the kiosk system 102. The entity table 502 may include a primary key-type data field (ENTITY_ID) which stores a unique identifier for each entity stored in the table. The entity table 502 may also include an SKU field which stores the actual SKU value assigned to a product and/or modifier in the table.

The entity table 502 also may include an SKU_OWNER_ID field. The SKU_OWNER_ID field stores data that identifies the device, system, person or organization that "owns" or maintains a SKU stored in a table record. For example, the owner of one record could be the kiosk application, while the owner of another record could be the POS system. The ENTITY table 502 may further include an SKU_DESC field. This field provides a more detailed description of the entity that is represented by the SKU in a particular row.

The database schema 500 also may include an SKU_OWNERS table 504. This table may include a primary key field SKU_OWNER_ID which uniquely identifies an SKU owner, and may also include a description of the owner stored in the SKU_OWNER_DESC field. The SKU_OWNER_ID may be a foreign key in the ENTITY table 502 to enforce referential integrity between the tables.

As noted above, the data schema 500 structures the menu data to more easily allow for the PRODUCT/MODIFIER menu flow described in connection with FIGS. 4A-4D above. Accordingly, SKU groupings may be created to model modifications of base products and combinations of multiple products on the menus (e.g., value combos). To that end, the database schema 500 may further include a SKU_GROUP_ENTITY table 506. Each record in the SKU_GROUP_ENTITY table 506 relates to a group of SKUs (from the ENTITY table 502) which are defined from the SKUs stored in the ENTITY table. The table fields include a SKU_GROUP_ENTITY_ID field which is the primary key field (and can be an auto-increment field), and the SKU_GROUP_ENTITY_PRICE field which indicates the total price for the SKUs included in that grouping. By structuring the menu data in terms of SKU groups, it is possible to represent SKUs differently in different contexts (e.g. a drink may cost $1.09 when ordered a la carte, but only cost $0.39 when ordered in a combo).

The SKU_GROUP_ENTITY table 506 does not include item SKU specific information in it, but rather only stores the group identifier and the price associated with the group. The details about the SKUs included in each SKU grouping may be instead stored in a SKU_GROUP_DETAILS table 508. Each row in the SKU_GROUP_DETAILS table represents a particular SKU that exists in a particular SKU Group (as specified by the SKU_GROUP_ENTITY_ID field). In many instances, the SKUs in an SKU grouping exist in a parent/child relationship. For example, mustard is a condiment for a hamburger. The parent/child relationship for this product/modifier would be hamburger (as the parent) and then mustard (as a child). In order to show this parent/child relationship between SKUs in an SKU group, the SKU_GROUP_DETAILS table 508 may also include a SORT_ORDER field which stores integer values that are indicative of an SKU's relative positioning within an SKU group. Although a particular database schema has been described in connection with FIG. 5, it is to be appreciated that this schema is merely one example of a database schema suitable for describing the data stored in the POS system 110.

FIGS. 6A-6C show three of the tables from FIG. 5 populated with sample data which may be used to generate a menu on the display of the kiosk 102. Referring specifically to FIG. 6A, an example of the ENTITY table 502 populated with SKU data is provided. As shown, the ENTITY table 502 includes data which logically divides the menu into products and modifiers. For example, the SKU with value SAND refers to a sandwich product. The SKU with the value CHICKEN refers to a chicken modifier. Similarly, the SKU with the value WHTBRD refers to white bread (which may be a product or a modifier depending upon its context). Referring now to FIG. 6B, the three SKUs discussed immediately above may be combined into an SKU group (SKU_GROUP_ENTITY_ID 0001) which is described as CHICKEN SANDWICH ON WHITE BREAD having a price of $5.99. The group details are stored in the SKU_GROUP_DETAILS table 506 which are shown in the first three records of the table provided in FIG. 6C.

As noted above, the database schema 500 that underlies the kiosk database 104 is created and designed without regard to the underlying POS system 110 in a QSR establishment, but at the same time is generalized to describe the data stored in the POS system 110. As a result, the data in the kiosk database 104 is not understandable by the POS system 110 and its underlying database. Because the data in the POS system 110 generally is considered to be the "authoritative" data for the restaurant, it is desirable for customer orders placed on the kiosk systems 102 to be immediately transmitted into the POS system 110 (and also possible a kitchen display system) so that the restaurant has a record of the transaction and can prepare the food. Similarly, it is desirable for the most up to date pricing and availability information to be made available to the kiosk system 102 from the POS system 110. In order to provide the immediate and accurate transfer of information between the kiosk system 102 and a POS system 110, the translation layer 316 is added between the kiosk system 102 and the POS system 110.

In some embodiments, the translation layer 316 may be provided by an extended markup language (XML) mapping file which describes how products and items offered on the menu of the kiosk system 102 relate to the SKUs in the POS system 110. FIG. 7 provides an example of a small portion of an XML mapping document 700 that may be used to map the SKUs in the POS database 206 (shown above in FIG. 2B) to the kiosk menu database 104 (as shown in FIGS. 5 and 6). The portion of the XML mapping document 700 shown includes examples of mappings between POS system 110 and the kiosk database 104 for sandwiches having meat.

The template application element shown in the mapping document 700 is used to group related templates, usually defined by the structure of the input parameters. In this example, it is assumed that all "sandwiches with meat choice" shown in the kiosk menu flow are structured in a similar hierarchical manner (the exact structure defined in the from SKUs element). The apply-template element defines specific implementations of the template by providing the needed input parameters. If the a new product is added to the menu flow 400 it would leave the document unchanged, except for adding one more "apply-template" element with the necessary information.

The template section provides an input and output mapping that is to be applied. The input mapping is defined in the from SKUs section. In the first implementation, the input would be a sandwich, with chicken and swiss cheese nested beneath it. The output section describes the resultant structure of SKUs. The "type" field indicates under what context these output SKUs are defined. In this example, the output SKUs are acceptable to be used both for obtaining price information and ordering in the POS system 110. If the QSR 100 also wants to map this set of from SKUs to a different context (e.g., SKUs acceptable for display on a kitchen display system) a second output element of type KDS (short for "kitchen display system") may be created with the needed structure. In the example provided by mapping the data schema from FIG. 2B to the menu flow 400, there is only one output SKU, even though there are multiple input SKUs.

In some embodiments, the XML mapping document 700 may be further enhanced to include additional mapping information. For example, the XML mapping document 700 may include price mapping information which allows for pricing information related to the kiosk SKUs to be obtained from the POS system 110 at regular intervals (e.g. once a day). Providing pricing mapping allows the QSR establishment to update its prices in the POS system and have those updated prices be reflected in the kiosk menu flow 400 is real time, or in near real time without needing to make any change to the kiosk programming. In other embodiments, product availability information may also be translated from the POS system 110 to the kiosk database 104. Thus, if a particular product is indicated as not being available for sale in the POS system 110, the kiosk system 102 will likewise not make the product orderable within the kiosk menu flow 400. Thus, by providing a mapping layer such as that shown in FIG. 7, the menu flow 400 is decoupled entirely from the structure of the underlying POS system 110 in a QSR, allowing the design and functionality of the kiosk menu flow be focused on providing an optimal ordering experience to the QSR guest. Although the mapping document 700 in FIG. 7 is presented as an XML document, it is to be appreciated that the mapping document could take various forms, and need not necessarily be an XML formatted file. For example, the translation layer 316 may be implemented using some other type of document format as a mapping template or records in a relational database.

Figure 8:
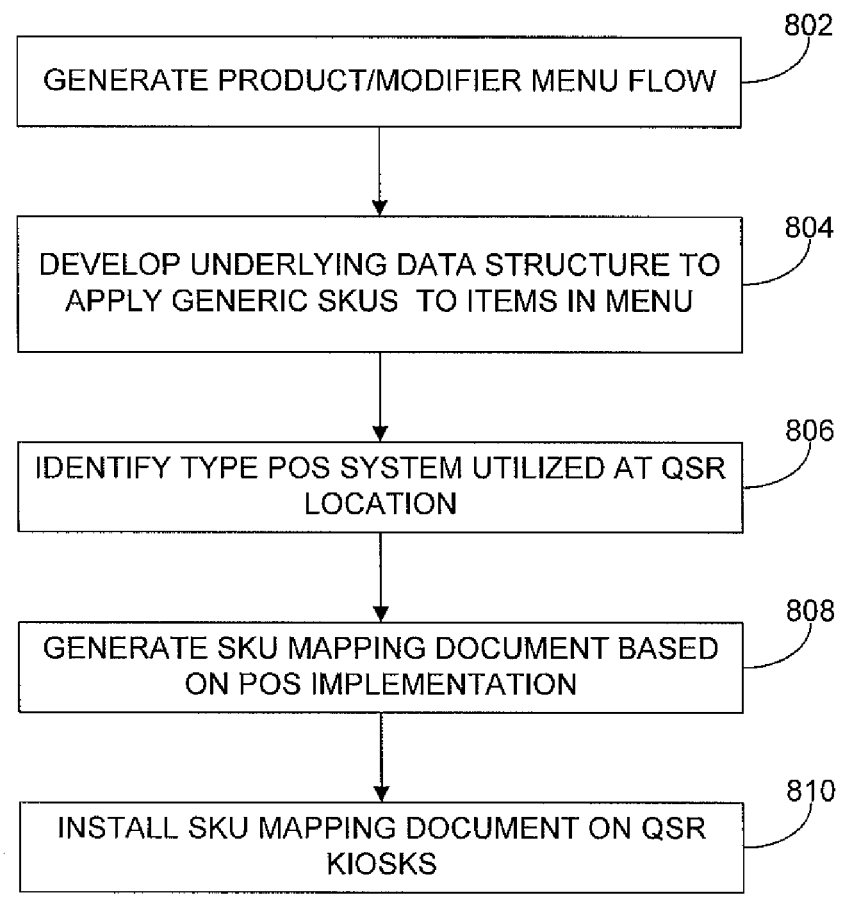
FIG. 8 is an example of a generalized process by which a kiosk system may be configured to integrate with a POS system.
Figure 9:
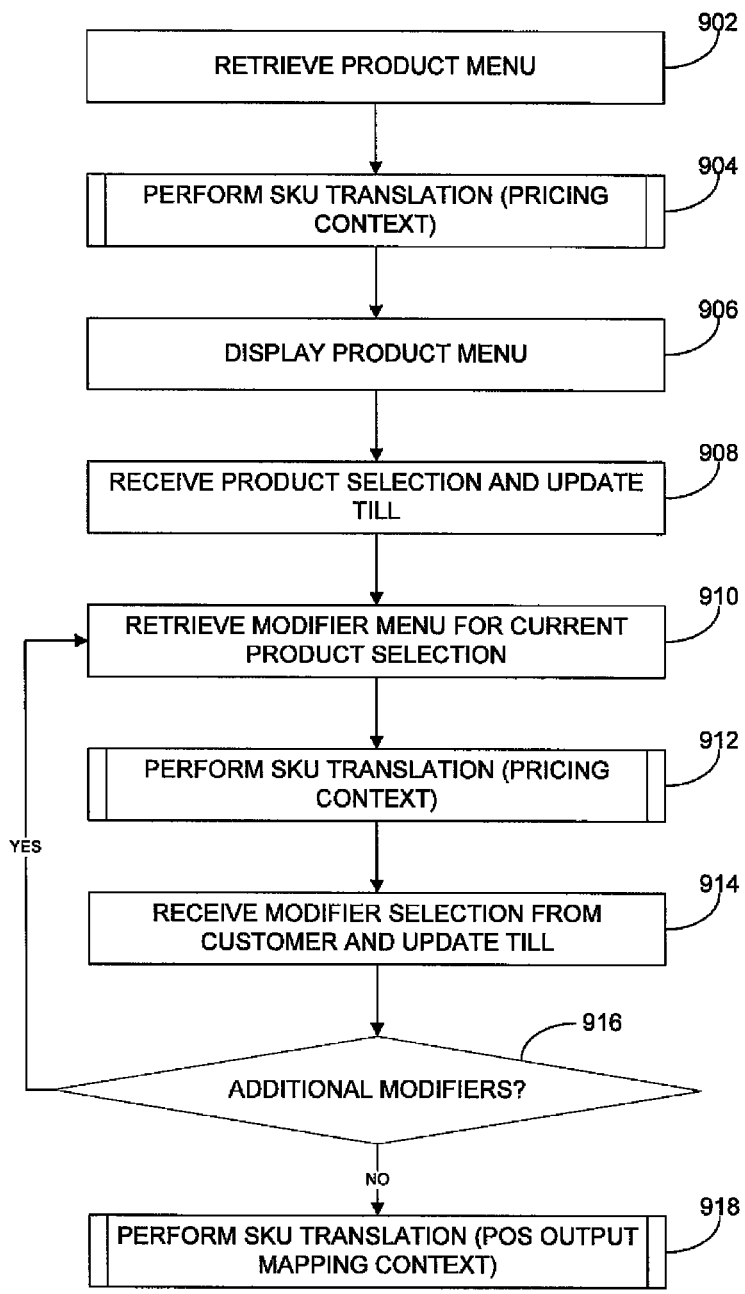
FIG. 9 is a flowchart illustrating how the kiosk system may receive customer-input orders via its user interface and integrate the orders with a POS system.
Figure 10:
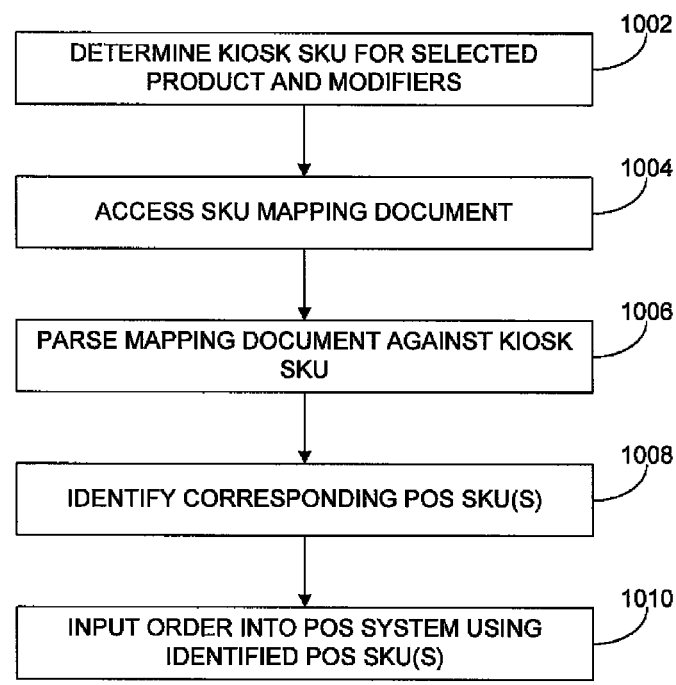
FIG. 10 is a more detailed flowchart of the SKU translation process from FIG. 9.

FIGS. 8-10 are flowcharts which describe the processes by which the SKU mapping may be performed within the QSR restaurant environment 100. FIG. 8 provides an example of a generalized process by which the menu flow 400 of the kiosk system 102 may be integrated with the POS system 110. FIG. 9 is a flowchart showing how the kiosk system 102 may receive customer-input orders via its user interface (which, as discussed above, may take the form of a touch screen graphical user interface environment supplemented by audio outputted instructions). FIG. 10 provides a more detailed view of the SKU translation process from the flowchart of FIG. 9.

FIG. 8 illustrates a process for integrating a kiosk system 102 with a POS system 110. The process begins at block 802, where a menu flow (such as menu flow 400, for example) is generated and included in the customer ordering application software 310. As noted previously, the menu flow may be developed to logically deconstruct menu items so that menu items (and their modifiers/customizations) are ordered in a "drill down" fashion to maximize up-selling opportunities. Next, the process moves to block 804, where an underlying data structure is developed to apply generic SKU values to the items defined in the menu flow. The generic SKU values may be generated in such a way as to identify conceptual products which are conceptually the same across different QSR franchises, but may be represented differently in the various POS systems used in the franchises.

The process then moves to block 806, where the type of POS system installed at the QSR location at which the kiosks system 102 will be installed. Based on the type of POS system 110 used, an SKU mapping document (such as XML mapping document 700) is then generated at block 808 in order to map the SKUs from the kiosk system 102 to SKUs stored in the POS system 110. Once the mapping document has been generated, it may then be stored on each of the kiosk systems 102 installed in the QSR location at block 810. Of course, the mapping document need not necessarily be stored on the kiosk system 102 itself, but may also be stored in a location on the network 106 accessible by the kiosk systems 102.

Once the mapping document 700 has been generated and made available to the kiosk systems 102, the kiosk systems may then integrate with the POS systems 110 without needing any additional programming. Moreover, in order to integrate with additional types of POS systems (and additional implementations of already mapped POS system types), a new SKU mapping document needs only be generated using the process of FIG. 8 as described above.

FIG. 9 is a flowchart illustrating how a kiosk system 102 may integrate with a POS system 110 in accordance with one or more embodiments. The process begins at block 902, where the ordering application software 310 of the kiosk system 102 causes the kiosk system to retrieve the product menu data from the kiosk data 104. Next, at block 904, the kiosk system performs an SKU translation in the pricing context. The SKU translation breaks down the data in the kiosk database into a data hierarchical tree data structure that is suitable for providing the menu flow 400 described above. Next, at block 906 the kiosk system generates the product menu and displays the menu on its user interface. The process then moves to block 908, where a product selection is made by the user touching an icon associated with a product the user wishes to order. Based on the product selected, the till 404 in the menu flow 400 may be updated to reflect the selection of the product.

Once the product selection has been received into the system 102, the process then moves to block 910, where the ordering application software 310 accesses the defined tree structure to retrieve the modifier menu for the selected product. For example, if a "hamburger" is selected, the menu flow 400 may retrieve the modifiers that are applicable to the hamburger—e.g., add cheese, add mustard, add ketchup, etc. Next, at block 912, SKU translation is performed on the retrieved SKU's to retrieve current pricing from the POS system 101 for the items to be displayed in the modifier menu. A modifier selection is then received at block 914 and the process continues to decision block 916 where it is determined whether there are additional modifiers to display to the user. These additional modifiers may include, for example, offering to "make it a combo", or offering additional toppings on the selected product. If there are additional modifiers available for the selected product, the process returns to block 910, where the next screen in the modifier menu for the current product selection is retrieved by the application 310. If, however, there are no modifiers remaining for the selected product, the process then moves to block 918, where the SKU translation is performed in the POS output context to translate the selected kiosk SKU an SKU for the POS system 110. Once the SKU translation has taken place, the order that was inputted by the customer is passed into the POS system 110 and stored in the POS database 206 as part of the customer's order. Of course, if the customer wishes to add additional products to their order, the process of FIG. 9 may be repeated until their order is complete.

Turning now to FIG. 10, a flowchart describes one example of how the SKU translation process from blocks 904, 912, and 918 may be performed. The process begins at block 1002, where the translation layer software 316 first matches the kiosk SKU stored in the kiosk database 104 to the products and/or modifiers selected by the customer. Next, at block 1004, the system accesses the SKU mapping document (such as mapping document 700, for example). The mapping document is then parsed at block 1006 to locate the kiosk SKU within the mapping document 700. Once the kiosk SKU is located within the mapping document, the process moves to block 1008, where the corresponding SKU (or SKUs) from the POS system 110 are identified. After the POS system 110 SKUs have been identified, the process then moves to block 1010, where the order is input into the POS system 110 using the POS SKU (or SKUs) identified by the SKU translation process.

FIG. 11 is a more detailed flowchart showing another example of an SKU translation process as applied to the SKU mapping document defined in FIG. 7. The process shown in FIG. 11 can be broadly divided into two phases: initialize and resolve. During the initialize phase (blocks 1102-1106), the SKU translation layer builds tree data structures based on data stored in the XML mapping document 700. During the resolve phase the tree structures received via orders input into the kiosk are matched to the appropriate mapping objects created during initialization.

The process begins at block 1102, where a tree data structure is created for each of the from SKUs element and each output element in the XML mapping document 700. The tree data structures may be encapsulated in a mapping object. Next, at block 1104, a cache is created which relates the root of each from SKUs element to a list of mapping objects. The process them moves to block 1106, where the list of mapping objects is sorted (typically in descending order) based on the number of elements in each from SKUs tree structure. Once these trees are built, the inputted order SKUs may then be resolved into their corresponding POS SKUs by moving to block 1108. At block 1108, the current order item root tree element is compared against the list of potential mapping objects to determine possible matches. At decision block 1110, if there is only one possible match, the process moves to block 1116, where the order item received from the kiosk menu flow 400 is replaced with the mapping object (which corresponds to a POS SKU). If there is more than one possible match at decision block 1110, the process then moves block 1112 where the order item tree is compared to the next mapping object in the generated list of mapping objects to determine if the order item tree is a subset of the mapping list object. If the tree is not a subset at decision block 1114, the process returns to block 1112 and the next object in the list is analyzed. If, however, the tree is a subset of the mapping list object, the process moves to block 1116 and the tree data structure received from the menu flow 400 is replaced with the mapping object result (e.g. POS SKU). Once the subset is replaced, the process moves to decision block 1118, where it is determined whether there are remaining unmapped elements in the order tree structure. If not, the mapping process ends at block 1120. If unmapped elements remain, the process returns to block 1108 so that the remaining elements may be resolved.

In view of the above, one will recognize that the disclosed embodiments provide the ability to create a single customer-operated kiosk quick service restaurant ordering system menu application which may be easily integrated with any number of different back office point of sale system implementations without compromising menu design and the customer user interface experience.

Those of skill will recognize that aspects of the kiosk systems and POS systems the various functions described herein may be embodied in one or more executable software modules that may be stored on any type of computer storage medium or system, and that some or all of the functions may alternatively be embodied in application-specific circuitry. The various illustrative logical blocks, modules, and algorithm steps described in connection with the embodiments disclosed herein may be implemented as electronic hardware, computer software, or combinations of both.

While the above detailed description has shown, described, and pointed out novel features of the invention as applied to various embodiments, it will be understood that various omissions, substitutions, and changes in the form and details may be made by those skilled in the art without departing from the spirit of the invention. As will be recognized, some embodiments of the present invention may not provide all of the features and benefits set forth herein, and some features may be used or practiced separately from others. The scope of the invention is indicated by the appended claims rather than by the foregoing description. All changes which come within the meaning and range of equivalency of the claims are to be embraced within their scope.

What is claimed is:

1. A computer-implemented method of integrating a customer-operated ordering kiosk system with a point of sale (POS) system, the method comprising:
   displaying a menu of food items available for ordering by the customer;
   receiving, at the kiosk system, a customer inputted selection of one of the food items from the menu;
   determining a kiosk SKU value based on the customer inputted selection;
   accessing SKU mapping data to determine one or more POS SKU values corresponding to the customer inputted selection; and
   transmitting the determined one or more POS SKU values to the POS system.

2. The computer-implemented method of claim 1, wherein the SKU mapping data comprises pricing data related to the customer selection.

3. The computer-implemented method of claim 1, wherein the customer inputted selection of the product comprises a selection of a product and a product modifier.

4. The computer-implemented method of claim 1, wherein accessing SKU mapping data comprises is performed at a translation layer stored on the kiosk system.

5. The computer-implemented method of claim 1, wherein the SKU mapping data comprises an XML-based mapping document.

6. The computer-implemented method of claim 5, wherein accessing SKU mapping data to determine one or more POS SKU values indicative of the customer inputted selection comprises parsing the XML-based mapping document.

7. The computer-implemented method of claim 1, further comprising providing a drill down menu flow to receive the customer input.

8. The computer-implemented method of claim 7, wherein the drill down menu flow provides up-selling opportunities directed to the customer.

9. The computer-implemented method of claim 8, wherein the XML-based mapping document comprises a plurality of parent tags indicative of product groups in the menu template tags, each template tag mapping at least one indicative of at least one product group choice.

10. The computer-implemented method of claim 7, wherein the receiving the customer inputted selection of a product comprises:
receiving a product selection;
accessing a kiosk database to identify available product modifications;
displaying one or more options indicative of the available product modifications; and
receiving a selection of one of the one or more options indicative of available product modifications.

11. The computer-implemented method of claim 10, wherein determining a kiosk SKU value based on the customer inputted selection comprises determining a product group associated with the product selection and the product modification selection.

12. A customer-operated kiosk ordering system for use in a quick service restaurant environment, comprising:
an ordering application configured to provide a customer-operated ordering input interface, the customer-operated ordering interface configured to display a menu of food items available for ordering by the customer;
a kiosk database configured to store data indicative of items available for ordering by customers utilizing the ordering application;
a translation module configured to receive kiosk SKU data from the ordering application based on an item ordered in the ordering application, and to translate the kiosk SKU data into one or more point of sale system (POS) SKU values corresponding to the item ordered; and
a network interface configured to transmit the one or more POS SKU values corresponding to the item ordered to a point of sale (POS) system.

13. The customer-operated kiosk ordering system of claim 12, wherein the customer ordering input interface comprises a touch screen ordering interface.

14. The customer-operated kiosk ordering system of claim 13, wherein the translation module comprises an SKU mapping document.

15. The customer-operated kiosk ordering system of claim 14, wherein the SKU mapping document comprises an XML document.

16. The customer-operated kiosk ordering system of claim 14, wherein content of the XML document is based on the configuration of the POS system.

17. The customer-operated kiosk ordering system of claim 12, wherein the customer-operated ordering input interface comprises a menu flow based on products and product modifiers.

18. The customer-operated kiosk ordering system of claim 17, wherein the ordering application is further configured, upon receiving a customer selection of a product, generate a submenu of available product modifiers related to the selected product.

19. The customer-operated kiosk ordering system of claim 12, wherein the POS system is configured to store SKU data in a flat file database.

20. The customer-operated kiosk ordering system of claim 12, wherein the ordering interface comprises a product/modifier menu flow, and wherein the kiosk database is structured in accordance with the product/modifier menu flow.

21. The customer-operated kiosk ordering system of claim 20, wherein the menu flow is independent of the POS system.

22. A computer-readable medium having computer-executable instruction stored thereon, which when executed, cause a computing device to perform a method of integrating a customer-operated ordering kiosk system with a point of sale (POS) system, the method comprising:
displaying a menu of food items available for ordering by the customer;
receiving, at the kiosk system, a customer inputted selection of one of the food items from the menu;
determining a kiosk SKU value based on the customer inputted selection;
accessing SKU mapping data to determine one or more POS SKU values corresponding to the customer inputted selection; and
transmitting the determined one or more POS SKU values to the POS system.

23. The computer-readable medium of claim 22, wherein the SKU mapping data comprises pricing data related to the customer selection.

24. The computer-readable medium of claim 22, wherein the customer inputted selection of the product comprises a selection of a product and a product modifier.

25. The computer-readable medium of claim 22, wherein accessing SKU mapping data comprises is performed at a translation layer stored on the kiosk system.

26. The computer-readable medium of claim 22, wherein the SKU mapping data comprises an XML-based mapping document.

27. The computer-readable medium of claim 26, wherein accessing SKU mapping data to determine one or more POS SKU values indicative of the customer inputted selection comprises parsing the XML-based mapping document.

28. The computer-readable medium of claim 22, further comprising providing a drill down menu flow to receive the customer input.

29. The computer-readable medium of claim 28, wherein the drill down menu flow provides up-selling opportunities directed to the customer.

30. The computer-readable medium of claim 29, wherein the XML-based mapping document comprises a plurality of parent tags indicative of product groups in the menu template tags, each template tag mapping at least one indicative of at least one product group choice.

31. The computer-readable medium of claim 28, wherein the receiving the customer inputted selection of a product comprises:
receiving a product selection;
accessing a kiosk database to identify available product modifications;
displaying one or more options indicative of the available product modifications; and
receiving a selection of one of the one or more options indicative of available product modifications.

32. The computer-readable medium of claim 31, wherein determining a kiosk SKU value based on the customer inputted selection comprises determining a product group associated with the product selection and the product modification selection.

* * * * *